Feb. 3, 1942. E. E. MINOR 2,271,531
AIRCRAFT FLIGHT CONTROL
Filed Sept. 13, 1939

Inventor
Edward E. Minor,
By Harrison Bates
Attorney

Patented Feb. 3, 1942

2,271,531

UNITED STATES PATENT OFFICE 2,271,531

AIRCRAFT FLIGHT CONTROL

Edward E. Minor, Baltimore, Md., assignor to The Glenn L. Martin Company, Baltimore, Md.

Application September 13, 1939, Serial No. 294,768

5 Claims. (Cl. 201—57)

This invention relates to a system of flight control for aircraft and the like. More particularly it relates to a system for flight control in which the control is effected through a change in resistance of an electrical path depending on the variation of distance between electrodes immersed in a fluid resistance. The invention also relates to special devices placed at various points of the aircraft, and provided with electrodes immersed in a fluid resistance, the distance between the electrodes of said devices varying depending on movement of the particular axis of the aircraft on which they are placed, and the variation in that distance effecting the control of the aircraft.

There are, of course, many systems of flight control but these are usually subject to a number of disadvantages. For example, they employ heavy hydraulic equipment with hydraulic pumps, pistons, motors, electric driving motor for the autopilot, lines and valves. Moreover, they are of a complicated nature, expensive to manufacture and install, and in addition, they are heavy, which is obviously an important consideration in aircraft equipment.

The present invention provides a very satisfactory automatic flight control avoiding these disadvantages. This is the principal object of the invention.

According to the present invention all hydraulic equipment for the autopilot is eliminated. There is no necessity for hydraulic pumps, pistons, motor, lines, valves, and so forth. Another object of the invention, therefore, is to provide a flight control device which is light in weight and reduces the required electrical load.

Still a further object is to provide a flight control device which may employ ordinary control motors.

Still a further object of the invention is to provide a flight control system which is easy to install and cheap and simple to manufacture.

The control according to the present invention is effected through an electric circuit which includes a pair of electrodes immersed in a resistance fluid and a third electrode normally spaced equidistant from the pair of electrodes to form a balanced circuit. For example, for directional control, a special adjustable compass potentiometer is used in which the third electrode moves with the compass card and rotation of the compass arrow off of the path of the aircraft will result in movement of the third electrode toward or away from the pair, thus causing a change in resistance in the electrical path. This change in resistance produces an unbalanced voltage in the circuit, which can be used to control power mechanism for actuating the vertical rudder to bring the aircraft back on its course.

Like circuits and arrangements are provided for horizontal flight control and for trim surfaces, but in these cases the adjustable compass potentiometer is replaced by a special device operating on the same principle but in which movement between electrodes is effected by tilting of the plane.

Other objects and advantages of the invention will be more apparent from the following description and claims when read on the accompanying drawing in which:

Figure 1:
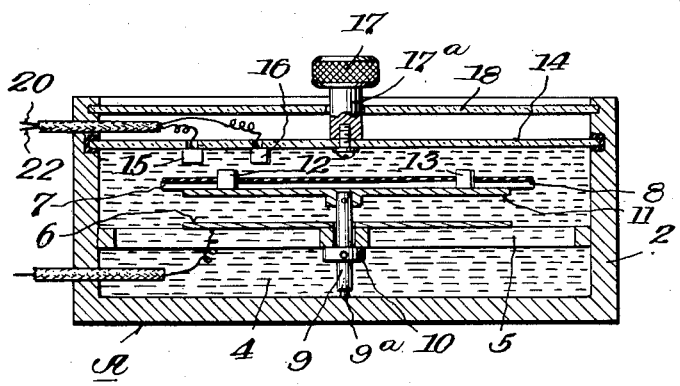
Fig. 1 is a cross section through a special adjustable compass potentiometer.

Referring now to Fig. 1, a special adjustable compass potentiometer for directional control is shown. This compass potentiometer consists of a casing 2 filled with a high resistance fluid 4. The resistance fluid may be methyl alcohol, which possesses the additional advantage of remaining liquid at very low temperatures. Fixedly supported in the lower part of the casing an annular plate 5 having a metal conducting surface 6 is mounted below compass dial 7 formed of Bakelite or other suitable insulating material.

Compass dial 7, carrying the usual compass magnet, indicated by reference numeral 8, is supported on center post 9 which, in turn, is rotatably supported by bearings 10 and 10a. On the under side, compass dial 7 is provided with a metallic conducting surface 11 to which is electrically connected the upstanding electrodes 12 and 13 extending upwardly through the insulating material forming compass dial 7, and which are 180° from each other on opposite sides of the dial.

Above the compass dial, a glass contact control plate 14 is rotatably mounted in the casing. Control plate 14 carries, on its under side, relatively fixed, angularly spaced electrodes 15 and 16 preferably of equal radial distance from the axis of the compass. The angular position of electrodes 15 and 16 may be adjusted by rotating adjusting knob 17 attached to plate 14 by shaft 17a, which passes through an aperture in a glass cover plate 18.

The electro-mechanical operation of this part of the device is as follows: the metallic conducting surface 6 of plate 5 is connected to the negative side of a source of current as later to be shown at 25 in circuit diagram. Electrodes 15 and 16 are connected by leads 20 and 22 through resistances to the positive side of the current source so that there is a tendency for the circuit to be completed through the resistance fluid from the conducting surface 6 to electrodes 15 and 16. Since the fluid has a relatively high resistance and the interposed metallic members are of relatively low resistance, current passes from conducting surface 7 to the metal surface 11 on the under side of the compass card, and from one or another of the electrodes 12 or 13 through the resistance fluid to the nearest of the spaced electrodes 15 or 16.

It should be noted that the two electrodes 12 and 13 are provided on the compass dial so that the glass contact control plate need only be rotated between 180° to place electrodes 15 and 16 equidistantly on each side, respectively, or one of the electrodes carried by the compass dial, regardless of the angular position of the dial.

When the plane carrying this compass is on its course, glass contact control plate 14 may be rotated by knob 17 so that electrodes 15 and 16 are equidistant from one of the electrodes carried by the compass dial. Under such conditions, an equal amount of current would pass to leads 20 and 22 connected in such a way as to control a rudder.

Thus, after either one of the electrodes 12 or 13 is electrically and mechanically centered between the spaced electrodes 15 and 16, an equal amount of current will flow to control leads 20 and 22. However, when the plane turns off its course, the current will flow from the electrode carried by the compass dial more readily to one or the other of electrodes 15 or 16, thus to reduce the potential in one of leads 20 or 22.

The change in direction of the current caused by movement of the plane off of its course is adapted to actuate the vertical control rudder to restore the plane to its proper course.

For directional control, the device thus operates in the following manner.

As long as the aircraft remains on its course no change will take place in the control device. If, however, the aircraft deviates from its course, the current will flow in one direction or the other. This in turn will actuate the vertical rudder which is thus consequently moved in one direction or the other, thus effecting directional control of the aircraft and resulting in placing the aircraft back on its proper course.

Figure 2:
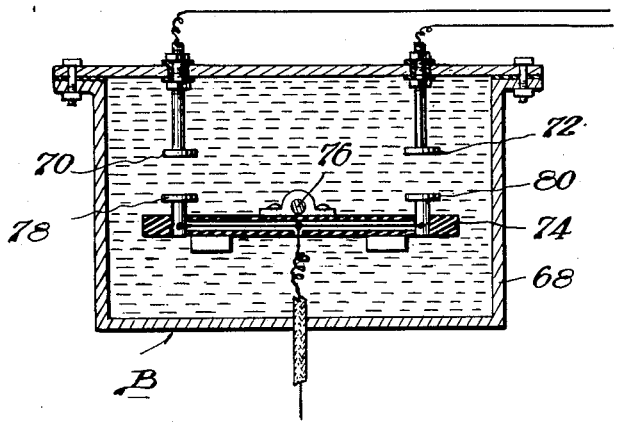
Fig. 2 is a cross section of a special device.

For the control of the horizontal control surfaces the special adjustable compass potentiometer for directional control is replaced by a special control device which is specifically illustrated in Fig. 2 of the drawing.

This special control device comprises a container 68 filled with a resistance fluid such as methyl alcohol. Passing through the top of the container and extending thereinto are two electrodes 70 and 72. Disposed below these electrodes is a balanced beam 74 which is pivoted at 76 to rock about a horizontal axis. The balanced beam 74 is provided with two electrode 78 and 80 which, when the beam rocks on the pivot 76, move towards and away from the electrodes 70 and 72 respectively. The electrodes 78 and 80 are connected to a lead passing through the base of the container.

The electrodes 70 and 72 are connected to control devices in the same manner as are the leads 20 and 22 of the adjustable compass potentiometer. For controlling the trim surfaces, a device similar to the one just described is employed. The operation of this device is the same in each case, namely, that movement of the electrodes toward or away from each other will unbalance a circuit causing operation of the controls.

It is to be undertood that preferably there are three such circuits on a plane. The first of these is for directional control to control the vertical rudder. For horizontal flight control a device is used of the type shown in Fig. 2. For trim surface control the same type of device is used as for control of the horizontal control surfaces. The only difference is that the axis of the balanced beam of the device is disposed at right angles to the axis of the balanced beam for the horizontal control device of Fig. 2.

In both the devices the high resistance fluid acts as a damper for the action of the movable members therein, as well as a variable electrical resistor.

It will be noted that the control system described is relatively simple in its structure and operation. It is established that all three controls with their circuits would weigh only approximately twenty pounds. Moreover, these would connect directly into existing lines. Furthermore, with the present invention, it is not necessary to have any hydraulic equipment for the automatic pilot or any hydraulic pumps, pistons, valves or the like.

Where the three control devices are used, they may all, if desirable, be mounted in a single container to form a unit.

Modifications of the system, and of the control devices shown, may be made without departing from the inventive concept, and the invention is not to be limited except as indicated in the following claims.

I claim:

1. In a device of the type described, a casing containing an electrolytic fluid and having first and second electrodes mounted in the lower and upper portions thereof, respectively, a compass dial rotatably mounted and extending between said first and second electrodes, said compass dial comprising lower and upper sheets of current conductive and insulating materials, such sheets being of less diameter than said casing, respectively, and a third electrode on said sheet of conductive material, the path between said third electrode means and said second electrode being unimpeded by said sheet of insulating material, said first and second electrodes being adapted for connection in a control circuit.

2. In a device of the type described, a casing containing an electrolytic fluid, a first electrode affixed in the lower portion of said casing, a compass dial, means mounting said compass dial above said first electrode for rotation about a substantially vertical axis, a second electrode, means mounting said second electrode in said casing above said compass dial for rotation about said vertical axis, said compass dial comprising a lower sheet of current-conductive material exposed, on its lower side, to said first electrode so as to form current pick-up means, and an upper sheet of insulating material substantially shielding the upper side of said current pick-up means from said second electrode, such sheets being of less diameter than said casing, and a third electrode on said compass dial in electrical contact with said current pick-up means, the path between said second and third electrodes being substantially unimpeded by said upper shreet, said first and second electrodes being adapted for connection in a control circuit.

3. In a device of the type described, a casing for containing an electrolytic fluid, a first electrode in one portion of said casing, a second electrode supported in another portion of said casing and spaced from the first electrode, orienting means movably mounted in said casing and extending between said first and second electrodes and adapted to remain substantially stationary upon certain movements of said casing and electrode means, said orienting means including current collector means exposed on the side opposite said first electrode, insulating means on the side opposite the second electrode shielding said current collector means from said second electrode, and a third electrode on said current collector means exposed to said second electrodes, said first and second electrode means being adapted to be connected in a control circuit.

4. The combination claimed in claim 2, the means mounting said second electrode means comprising a substantially circular transparent plate, and substantially annular support means on the upper portion of said case rotatably supporting said plate.

5. The combination claimed in claim 2, said third electrode means comprising an upstanding member of electrically conductive material extending upwardly through an opening in said upper sheet of insulating material, the means mounting said second electrode means comprising a transparent plate on the under side of which said second electrode means are secured.

EDWARD E. MINOR.